United States Patent [19]
Mendel et al.

[11] 3,727,106
[45] Apr. 10, 1973

[54] GROUND FAULT PROTECTION SYSTEM

[75] Inventors: James T. Mendel, Fair Oaks; Ronald G. Whitaker, Los Angeles, both of Calif.

[73] Assignee: Zinsco Electric Products, Los Angeles, Calif.

[22] Filed: June 9, 1972

[21] Appl. No.: 261,486

[52] U.S. Cl. ............... 317/18 R, 317/33 SC, 317/46, 317/58
[51] Int. Cl. .............................................. H02h 7/26
[58] Field of Search .................. 317/18 R, 33 SC, 317/46, 58; 340/255

[56] References Cited
UNITED STATES PATENTS

| | | |
|---|---|---|
| 3,113,244 | 12/1963 | Kurt .............................. 317/18 R |
| 3,325,685 | 6/1967 | Hoel .............................. 317/58 X |
| 3,376,477 | 4/1968 | Weinger ......................... 317/18 D |
| 3,524,133 | 8/1970 | Arndt ............................ 317/22 X |

Primary Examiner—James D. Trammell
Attorney—Harris, Kern, Wallen & Tinsley

[57] ABSTRACT

A ground fault protector for use with an A. C. electrical power distribution system and particularly suited for operation at current levels in the range of 150 to 1,200 amperes. A ground fault protector for sensing fault current in the ground strap and tripping the circuit breaker switch to open the power lines. A magnetically operated reed switch mounted at the ground strap and a solid state circuit actuated by reed switch closure to energize the breaker trip coil, with current sensitivity provided by an adjustable mounting for the reed switch, eliminating adjustment in the electronics.

11 Claims, 6 Drawing Figures

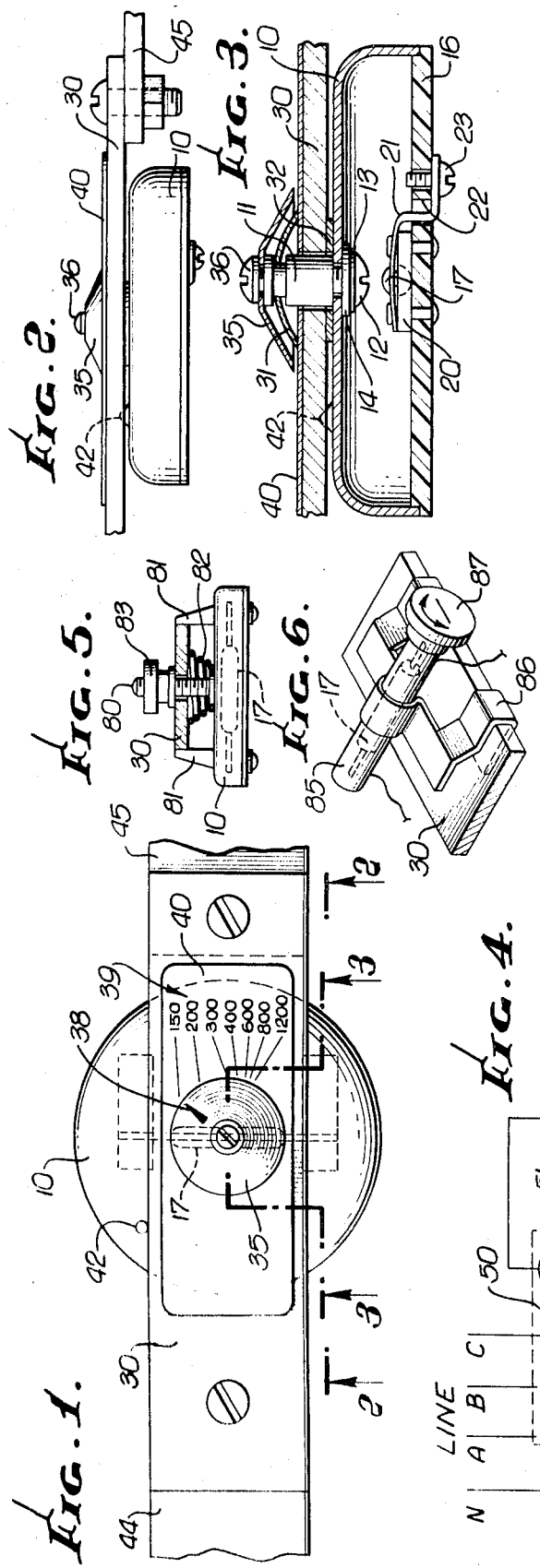
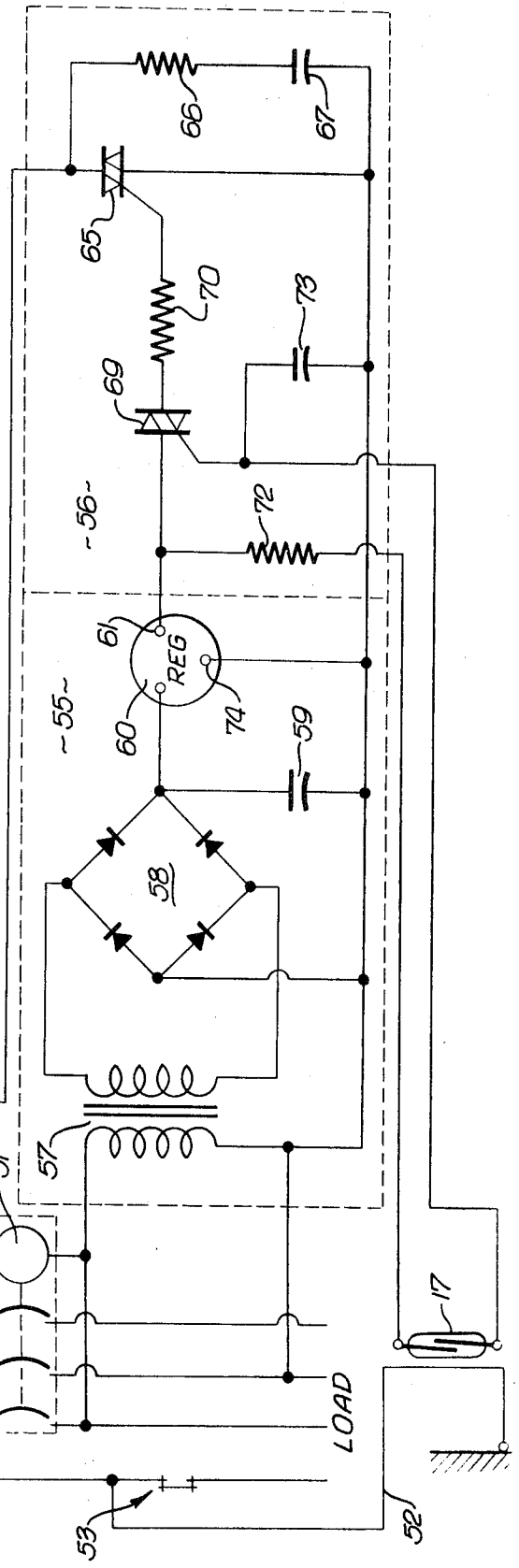

3,727,106

GROUND FAULT PROTECTION SYSTEM

BACKGROUND OF THE INVENTION

This invention relates to ground fault protection for A. C. electrical power distribution systems and is particularly adapted for operation at current levels in the range of 150 to 1,200 amperes.

A typical A. C. distribution system will have three power lines and a neutral line with a circuit breaker or disconnect switch in the three power lines and a ground connection for the neutral, this ground connection typically being referred to as a ground strap. Many present day electrical installations require as a safety feature, the tripping of the circuit breaker switch to open the power lines when fault current in the ground strap exceeds a preset value. A typical prior art ground fault protector is shown in U.S. Pat. No. 3,113,244 and includes a current transformer positioned about the ground strap, and a current responsive relay energized by the current transformer output, with relay closure actuating the trip coil of the circuit breaker. Some other applications of current transformers are shown in U.S. Pat. Nos. 3,376,477; 3,443,158; and 3,524,133.

The utilization of current transformers in ground fault protection systems presents a number of problems. Current transformers are inherently expensive and they have fixed sensitivity, requiring some adjustment for sensitivity in some other portion of the system. Current transformers are active devices and under certain conditions can develop high voltages that are potentially dangerous to personnel and equipment.

It is an object of the present invention to provide a new and improved ground fault protector which does not require a current transformer or other active device and which is inexpensive, small, safe and reliable. A further object is to provide such a ground fault protector which can be mounted directly on a ground strap or connected in circuit with a ground strap and including a mechanical adjustment at the mounting for adjusting sensitivity over a wide operating range, typically over the range of 150 to 1,200 amperes.

SUMMARY OF THE INVENTION

A magnetically operated reed switch mounted at the ground strap and including means for moving the reed switch relative to the ground strap for sensitivity adjustment, and an electrical circuit, preferably solid state, for connecting the reed switch to a circuit breaker trip coil to trip the breaker when a fault current in the ground strap exceeds a predetermined value. A time delay may be built into the electronics, typically a resistance-capacitance circuit, to provide any desired delay between initial closure of the reed switch and tripping of the breaker.

BRIEF DESCRIPTION OF THE DRAWING

FIG. 1 is a top view of a ground fault protector incorporating the presently preferred embodiment of the invention;

FIG. 2 is a side view of the device of FIG. 1;

FIG. 3 is an enlarged sectional view taken along the line 3—3 of FIG. 1; and

FIG. 4 is an electrical schematic for the device of FIG. 1; and

FIGS. 5 and 6 show alternative embodiments of the invention.

DESCRIPTION OF THE PREFERRED EMBODIMENTS

A case 10, preferably of a nonmagnetic material such as aluminum or brass, has a shaft 11 affixed thereto by a screw 12 with lock washer 13 and flat washer 14. An insulator 16 is mounted in the case 10, as by cementing with an epoxy or by crimping or the like, and a reed switch 17 is carried on the insulator 16.

The reed switch 17 is conventional in design and typically is an elongate cylinder with ribbon type electrical leads at each end. The reed switch may be clamped in place by positioning it between spacer blocks 20 with conductors 21 overlying the spacer blocks and switch leads and with the conductors 21 and blocks 20 affixed to the insulator 16 as by riveting.

The conductors 21 may be Z-shaped and pass to the outside of the case through openings 22 in the insulator 16. A screw 23 is threadedly inserted into the outer end of each conductor 21 for connecting the reed switch into an electrical circuit.

The case 10 carrying the reed switch 17 may be mounted on a length of electrical bus 30 by positioning the shaft 11 in an opening through the bus 30, with the shaft being held in place by a spring washer 31 engaging an annular groove in the shaft 11. A bearing shim 32 may be positioned between the case 10 and the bus 30. A conical cover 35 is affixed to the end of the shaft 11 by a screw 36.

A pointer 38 is provided on the cover 35 and traverses a plurality of scale markings 39 as the case is rotated in the bus. The scale markings which may be placed on a label 40 on the bus 30, indicate the current at which the reed switch is actuated for various rotational positions of the switch. A dimple 42 in the case 10 may serve as a rotational stop by engaging the edge of the bus 30.

A typical electrical distribution system may utilize a length of bus for the ground strap and the case carrying the reed switch may be mounted directly on the ground strap bus through a hole provided in the bus. Alternatively, the case may be mounted in a short length of bus as shown in FIGS. 1 and 2, with the short length of bus 30 being suitable for attaching to other conductors forming the ground strap, such as the bus sections 44, 45.

In the diagram of FIG. 4, the ground fault protector is utilized with a three-phase system having power lines A, B, C and neutral line N. A circuit breaker switch 50, which may be conventional, provides for connecting the line side to the load side of the power lines A, B, C. The switch 50 includes a trip coil 51 which functions to trip or open the breaker switch when energized. The neutral line N is connected to ground by a ground strap conductor 52. A conventional bolted disconnect section is provided in the neutral line at 53.

The control circuitry includes a power supply section 55 and a time delay and gating section 56. The power supply provides regulated D. C. power for the gating section and may be conventional in design, including a transformer 57 having its primary connected across power lines A and B and having its secondary connected to a rectifier 58. A filter capacitor 59 and an integrated circuit voltage regulator 60 are connected at the output of the rectifier 58 to provide the regulated D.C. at terminal 61.

A triac 65 is connected in series with the trip coil 51 across the power lines A and B. A transient suppression circuit comprising resistor 66 and capacitor 67 is connected across the triac 65.

Another triac 69 and a bias resistor 70 are connected in series between the terminal 61 and the control element of the triac 65. The reed switch 17 is connected in series with a bias resistor 72 between the terminal 61 and the control element of the triac 69, with a capacitor 73 connected between the control element and the other terminal 74 of the D. C. output.

In operation, the reed switch 17 is normally open. A current through the ground strap produces a magnetic field about the ground strap and when this field rises to a predetermined value, the reed switch elements are moved to close the switch. The magnitude of current in the ground strap required to close the switch can be adjusted by rotating the switch relative to the ground strap. When the switch 17 is closed, the capacitor 73 is charged through the resistor 72. When the charge on the capacitor 73 builds up to a predetermined value, the triac 69 is switched into conduction which then switches the triac 65 into conduction energizing the trip coil 51 to release the breaker 50.

The sensitivity of the ground fault protector, that is, the magnitude of fault current required to open the breaker, is adjusted by moving the reed switch relative to the ground strap, as by rotating the case 10. This is the only sensitivity adjustment for the system. It is usually specified that a ground fault protector have a delay between the appearance of the fault current and the tripping of the breaker and typical delays are in the range of 0.1 to 0.6 seconds. The time required to charge the capacitor 73 through the resistor 72 to the value necessary to switch the triac 69 into conduction provides this desired delay. The duration of the delay is readily selected by appropriately selecting the time constant of the RC circuit. Any desired delay can be achieved. In an alternative arrangement, particularly for longer delay times, a motor driven timer can be utilized with the reed switch 17 providing a start signal for the timer motor.

Alternative constructions for adjusting the sensitivity of the ground fault protector are shown in FIGS. 5 and 6, where elements corresponding to those of FIGS. 1–3 are identified by the same reference numerals. In the embodiment of FIG. 5, a threaded post 80 is carried on the case 10 and projects through an opening in the bus 30. Spaced guide members 81 are also carried on the case 10 and slidingly engage opposite edges of the bus 30. A spring 82 is positioned about the post 80 between the case and bus, with a nut 83 threaded onto the end of the post. The case with the reed switch 17 therein is moved toward and away from the bus 30 by turning the nut 83 on the post 80.

In the embodiment of FIG. 6, the reed switch 17 is positioned in a sleeve 85 which in turn is carried in a spring clip 86 mounted on the bus 30, with the sleeve 85 rotatable in the clip 86 about the longitudinal axis of the reed switch 17. A knob 87 with an index mark indicating the rotational position of the reed switch, may be provided on the sleeve 85.

We claim:

1. In a ground fault protector for use with an A. C. electrical power distribution system having a plurality of power lines and a neutral line, a line switch for the power lines with a trip mechanism, and a ground strap for connecting the neutral line to system ground, the combination of:

a magnetically operated reed switch;
   means for mounting said reed switch at said ground strap and including means for moving said reed switch relative to said strap; and
   circuit means for connecting said reed switch to said trip mechanism for actuating said trip mechanism to open said line switch when said reed switch is actuated by a current in said ground strap.

2. A ground fault protector as defined in claim 1 wherein said circuit means includes means for introducing a predetermined time delay between the actuation of said reed switch and the actuation of said trip mechanism.

3. A ground fault protector as defined in claim 1 wherein said circuit means includes:

a D. C. power source;
   a solid state switch with a control gate; and
   a resistor and a capacitor connected in series with said reed switch across said D. C. source for charging said capacitor through said reed switch and resistor,
   with said capacitor connected to said control gate for switching said solid state switch into conduction and actuating said trip mechanism when said capacitor charges to a predetermined value providing a time delay between the actuation of said reed switch and the actuation of said trip mechanism.

4. A ground fault protector as defined in claim 3 wherein said reed switch has an elongate form with a longitudinal axis and said ground strap has a flat face and said mounting means includes means for mounting said reed switch with its longitudinal axis parallel to said flat face and means for rotating said reed switch about an axis perpendicular to said flat face.

5. A ground fault protector as defined in claim 1 wherein said reed switch has an elongate form with a longitudinal axis and said ground strap has a flat face and said mounting means includes means for mounting said reed switch with its longitudinal axis parallel to said flat face and means for rotating said reed switch about an axis perpendicular to said flat face.

6. A ground fault protector as defined in claim 5 wherein said reed switch has conductors projecting at opposite ends, and said means for rotating includes:

a case;
   an insulator mounted in said case;
   spaced standoffs on said insulator with said reed switch therebetween and with the conductors thereof on said standoffs; and
   straps affixed to said standoffs clamping said reed switch conductors therebetween, at least one of said standoffs and straps being electrically conducting for connecting said reed switch into said circuit means.

7. A ground fault protector as defined in claim 5 in which said means for rotating includes:

a case for said reed switch and having a fixed shaft for rotation in a hole in said ground strap;
   locking means for engaging the outer end of said shaft and holding said case to said ground strap; and a pointer mounted on said outer end for indicating rotational position of said reed switch.

8. A ground fault protector as defined in claim 7 including a short length of electrical bus with said case mounted therein, and having means at each end for attachment to an electrical conductor.

9. A ground fault protector as defined in claim 1 wherein said reed switch has an elongate form with a longitudinal axis, and said mounting means includes means for mounting said reed switch with its longitudinal axis parallel to a face of said ground strap and means for rotating said reed switch about an axis perpendicular to said face with rotation of said reed switch providing adjustment for sensitivity of said ground fault protector.

10. A ground fault protector as defined in claim 1 wherein said reed switch has an elongate form with a longitudinal axis and said ground strap has a flat face and said mounting means includes means for mounting said reed switch with its longitudinal axis parallel to said flat face and means for moving said reed switch toward and away from said flat face.

11. A ground fault protector as defined in claim 1 wherein said reed switch has an elongate form with a longitudinal axis and said ground strap has a flat face and said mounting means includes means for mounting said reed switch with its longitudinal axis parallel to said flat face and means for rotating said reed switch about its longitudinal axis.

* * * * *